(12) United States Patent
Lewis

(10) Patent No.: US 6,876,295 B1
(45) Date of Patent: Apr. 5, 2005

(54) WIRELESS COMMUNICATION DEVICES CONFIGURABLE VIA PASSIVE TAGS

(75) Inventor: Daniel E. Lewis, The Woodlands, TX (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/212,833

(22) Filed: Dec. 16, 1998

(51) Int. Cl.$^7$ ............................................. H04Q 1/00
(52) U.S. Cl. .................................. 340/10.34; 340/10.1
(58) Field of Search ...................... 340/10.34, 10.1, 340/10.51, 10.52, 572.1, 10.32; 455/551, 556, 418, 419, 420, 558; 370/311, 313, 314, 254, 338, 310.2; 709/222

(56) References Cited

U.S. PATENT DOCUMENTS

| | | | |
|---|---|---|---|
| 4,827,395 A | * 5/1989 | Anders et al. | ........... 340/10.34 |
| 5,394,367 A | 2/1995 | Downs et al. | |
| 5,465,401 A | * 11/1995 | Thompson | ................... 455/558 |
| 5,517,194 A | 5/1996 | Carroll et al. | |
| 5,539,394 A | * 7/1996 | Cato et al. | ................ 340/10.32 |
| 5,682,143 A | 10/1997 | Brady et al. | |
| 5,776,278 A | 7/1998 | Tuttle et al. | |
| 5,787,174 A | 7/1998 | Tuttle | |
| 5,848,064 A | * 12/1998 | Cowan | ......................... 370/338 |
| 6,046,676 A | * 4/2000 | Ward et al. | ............... 340/572.1 |
| 6,064,649 A | * 5/2000 | Johnston | ................... 370/310.2 |
| 6,177,860 B1 | * 1/2001 | Cromer et al. | ............. 340/10.1 |

FOREIGN PATENT DOCUMENTS

WO 9711446 3/1997

\* cited by examiner

Primary Examiner—Edwin C. Holloway, III
(74) Attorney, Agent, or Firm—Renner, Otto, Boisselle & Sklar, LLP (57) ABSTRACT

A wireless communication device which includes a passive radio-frequency (RF) tag having a memory for receiving and storing initial configuration information utilized by the device. The initial configuration information is written to the wireless communication device without requiring that the device be fully assembled, operational, powered up, removed from packaging, etc. An RF controller transmits initial configuration information to the passive tag using an RF signal. The passive tag derives sufficient energy from the RF signal to store the initial configuration information in memory. The wireless communication device further includes an interface which allows a processor within the device to access the initial configuration information upon such time when the device is removed from its packaging, powered up and operational.

6 Claims, 4 Drawing Sheets

WIRELESS COMMUNICATION DEVICES CONFIGURABLE VIA PASSIVE TAGS

TECHNICAL FIELD

The present invention relates generally to wireless communication systems, and more particularly to devices configured to operate within such systems.

BACKGROUND OF THE INVENTION

In recent years, the use of wireless communication systems having mobile transceivers which communicate with a hardwired network, such as a local area network (LAN) or a wide area network (WAN), has become widespread. The mobile transceivers, commonly referred to as mobile terminals, may take one of several different forms. For instance, in retail stores hand-held scanning units may be used to allow for scanning inventory bar codes. In a warehouse, portable units mounted to a vehicle may be used to gather information from the warehouse floor. In a medical environment, the mobile terminal may take the form of a pen based workslate which allows medical personnel to work with full page screens at once.

In a typical wireless communication system, each mobile terminal communicates with a networked system via a radio or optical link in order to allow for a real time exchange of information. The mobile terminals communicate through one of several access points interconnected to the network. The access points allow for a wireless data communication path to be formed.

Information exchanged between mobile terminals and access points is generally sent in packet format. Packets of information (also referred to herein simply as "packets" or "data packets") are a defined set of data bits which carry information such as source address, destination address, synchronization bits, data, error correcting codes, etc. Such packets oftentimes are encrypted, etc.

Mobile terminals and access points typically need to be properly configured prior to their introduction into a wireless network system. For example, mobile terminals and access points typically are manufactured in volume and stored in inventory. When a request for a mobile terminal or access point is received, the requested device is retrieved from inventory and is initially configured via programming for the particular wireless network environment in which it will be used. For example, various information including the device serial number, communication parameters such as the network identification, network address, etc., needs to be programmed initially into the device before it will operate in the particular wireless network system.

Additionally, other types of initial configuration information is oftentimes programmed into the device prior to delivery to the customer. For example, special codes which identify modes of operation, enable/disable various features of the device, etc. are entered into the device. In addition, oftentimes it is desirable to program one or more passwords, encryption keys, etc. into the device in order to restrict access when implemented in the network.

In the past, programming of such initial configuration information into the wireless communication device was carried out by providing a hardwired connection between the device and a programming platform. Typically such hardwired connection was provided via an input/output (I/O) port included in the device. A controller within the programming platform would transmit the configuration information to the device via the I/O port where it would in turn be stored in memory. On the other hand, the initial configuration information can be entered into the device manually via a keypad or touchscreen, for example.

Alternatively, the configuration information could be transmitted to the device via a radio frequency (RF) signal or the like. Since both mobile terminals and access points include RF transceivers typically, a controller could be used to transmit the configuration information to the device via an RF signal so that it may be stored in memory. Such approach, however, requires that the wireless communication device initially power up under a factory default configuration and then download the appropriate network configurations. This can present significant logistical problems and can require that the purchaser also be able to communicate on factory default settings.

A disadvantage associated with both the hardwired, manual and wireless approaches to programming the configuration information is that each requires that the device be both operational and in a powered-on state. This can present a problem for a large number of reasons. For example, a mobile terminal or access point may not be fully assembled and operational at a time when it is most convenient/cost effective to perform the initial configuration programming. This necessitates delaying programming until such time as the device is fully assembled and operational.

Furthermore, the need for the device to be in a powered-on state creates additional difficulties. For example, if the device is battery powered it necessitates that the battery be charged at the time of initial programming. If the device is powered by a standard 110VAC supply, for example, it necessitates that separate power be connected to the device. In addition, if the device has previously been packaged in a box, for example, the device must be removed from the packaging in order to be powered up and programmed. Thus, any devices which have been packaged and stored in inventory must be removed prior to programming.

Such requirements, e.g., fully assembled, operational, powered up, removed from packaging, etc., add significantly to the time and cost associated with initially configuring the mobile terminals and access points. In view of the aforementioned and other shortcomings, there is a strong need in the art for a system in which such wireless communication devices can be initially configured without requiring full assembly and operation. Moreover, there is a strong need for a system which does not require that the devices be powered up or even removed from their packaging. Such a system would significantly reduce the time and/or cost associated with programming the initial configuration information into the devices.

SUMMARY OF THE INVENTION

A wireless communication device is provided which includes a passive radio-frequency (RF) tag having a memory for receiving and storing initial configuration information utilized by the device. The passive tag is a circuit which does not require power from its own power supply. Rather, the passive tag relies on energy derived from an RF signal used to write the initial configuration information to the memory within the passive tag.

In such manner, the initial configuration information is written to the wireless communication device without requiring that the device be fully assembled, operational, powered up, removed from packaging, etc. An RF controller is used to transmit initial configuration information to the passive tag using an RF signal. The passive tag derives sufficient energy from the RF signal to store the initial configuration information in memory. The wireless communication device further includes an interface which allows a processor within the device to access the initial configuration information upon such time when the device is removed from its packaging, powered up and operational.

According to one aspect of the invention, a wireless communication device is provided which includes a transceiver for communicating in a wireless network; a processor for controlling operations of the transceiver based on initial configuration information; a passive tag for receiving the initial configuration information from an external source and storing the initial configuration information in a non-volatile memory at a time when the wireless communication device is otherwise in a non-operational mode; and an interface for enabling the processor to access the initial configuration information stored in the memory when the wireless communication device is in an operational mode.

According to another aspect of the invention, a method is provided for use in relation to a wireless communication device including a transceiver for communicating in a wireless network, a processor for controlling operations of the transceiver based on initial configuration information and a passive tag. The method includes the step of transmitting the initial configuration information from a source external to the wireless communication device so as to be received by the passive tag and stored in a non-volatile memory within the passive tag while the wireless communication device is otherwise in a non-operational mode.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

The present invention will now be described with reference to the drawings wherein like reference numerals are used to refer to like elements throughout.

Figure 1:
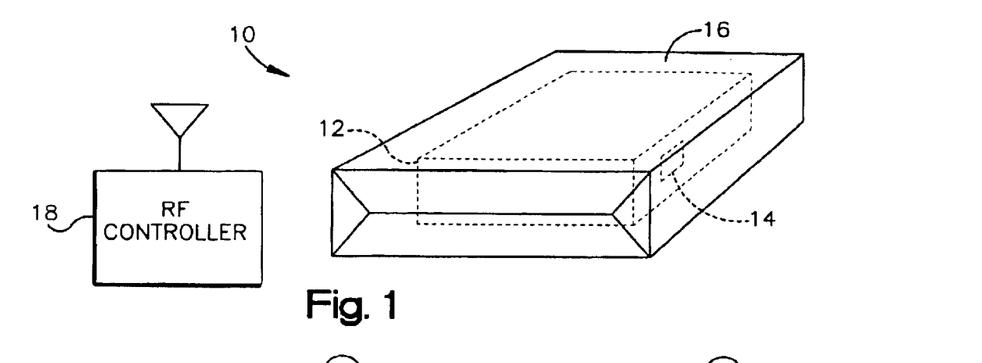
FIG. 1 is a system diagram illustrating a wireless communication device having a passive tag in accordance with the present invention, together with an RF controller for programming initial configuration information therein.

Referring initially to FIG. 1, a system for programming initial configuration information into a wireless communication device is generally designated 10. The system 10 includes a wireless communication device 12 (shown in phantom) such as a mobile terminal. As will be explained in more detail below, the mobile terminal 12 includes a passive tag 14 (also shown in phantom) which serves to receive and store initial configuration information used by the mobile terminal 12 to operate within a conventional wireless network.

The mobile terminal 12 as shown in FIG. 1 is enclosed in packaging 16 for sake of example. Although such packaging 16 is not necessary to the invention, it helps to illustrate the utility of the invention. The packaging 16 may be any type of packaging such as cardboard, etc.; however the packaging 16 must be penetrable by an RF signal as will be appreciated. The mobile terminal 12 within the packaging 16 may be stored on a shelf in a warehouse or the like as will be further appreciated.

The system 10 further includes an RF controller 18 which serves to transmit an RF signal used to program the initial configuration information into the mobile terminal 12 via the passive tag 14. The RF controller 18 includes a radio transmitter which transmits a signal at a frequency at which the passive tag 14 is tuned to receive. As will be described in more detail below in connection with FIGS. 4 and 5, the passive tag 14 derives sufficient power from the RF signal to operate.

The RF controller 18 modulates the transmitted RF signal with the initial configuration information. The RF signal is transmitted through the packaging 16 and is received by the passive tag 14. The passive tag 14 demodulates the RF signal to obtain the initial configuration information and stores the same in a memory included therein. Upon being powered up in a conventional manner, a processor within the mobile terminal 12 accesses the initial configuration information stored in the memory so that the mobile terminal 12 may operate in the wireless network for which it is destined. In this manner, the mobile terminal 12 receives and stores the initial configuration information without requiring being removed from the packaging 16, powered up, etc.

In fact, the mobile terminal 12 need not even be fully assembled at such time as the initial configuration information is provided thereto. The portion of the mobile terminal 12 including the passive tag 14 may later be combined with any remaining portions of the mobile terminal in order to complete assembly.

The initial configuration information stored in memory in the passive tag 14 simply resides in memory until the mobile terminal 12 is assembled and powered up.

The initial configuration information which is stored in the passive tag 14 via the RF controller 18 may be of the type described above, e.g., device serial number, network identification, passwords, encryption keys, etc. The initial configuration data may contain RF configuration data which allows the mobile terminal 12 to associate with a network access point and communicate within the network for which it is destined upon power up.

The initial configuration may also include instructions and a password for locating and communicating with an FTP server to download a software package. The FTP server may be on the network of the customer in which the mobile terminal 12 is to be utilized. Alternatively, the FTP server may be controlled by the manufacturer. The mobile terminal 12 accesses the manufacturer's FTP server via a gateway on the customer's network and the Internet, for example.

Upon being powered up, the mobile terminal 12 accesses the initial configuration information from the memory in the passive tag 14 and retrieves the instructions for locating the FTP server. The mobile terminal 12 then communicates with the FTP server (e.g., locally or via the Internet). The advantage of such an approach is that the manufacturer does not have to load all of the software the customer purchases with the mobile terminal. Instead, the initial configuration information stored in the passive tag 14 may be used to identify the purchased software and provide a password and instructions for accessing the software from the FTP server.

Figure 2:
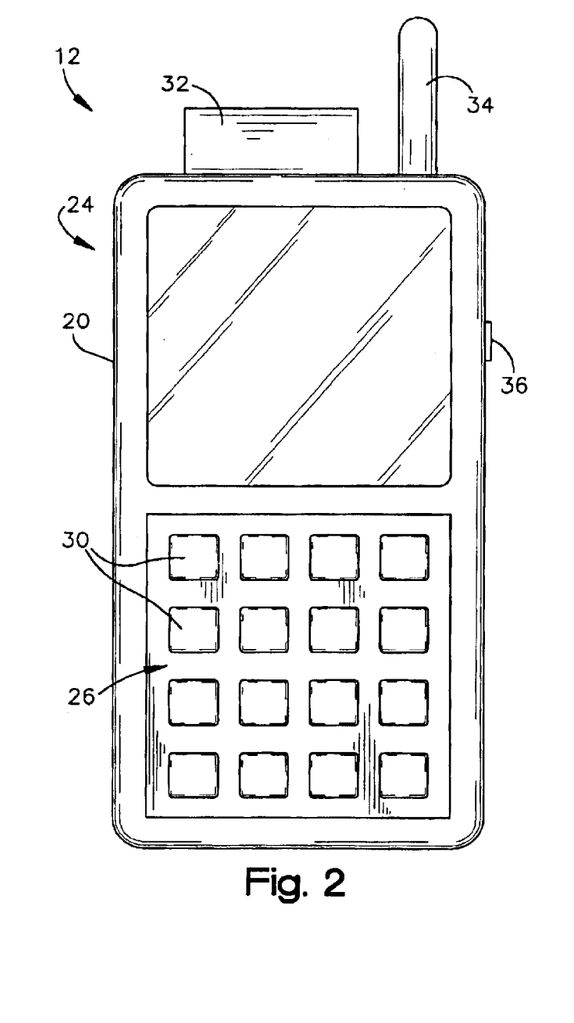
FIG. 2 is a front view of an exemplary mobile terminal in accordance with the present invention.

FIG. 2 illustrates an exemplary mobile terminal 12 including a passive tag 14 in accordance with the present invention. The mobile terminal 12 includes a main housing 20 made of molded plastic or the like. The main housing 20 preferably is sized to fit conveniently in the hand of an operator. Included within the main housing 20 is a display 24. The display 24 may be a conventional liquid crystal display (LCD) such as an active matrix LCD or the like. Alternatively, the display 24 may be an electroluminescent type display, etc.

The mobile terminal 12 further includes a keypad 26 having a plurality of different keys 30 arranged in a predefined configuration. Each key 30 includes thereon a label (not shown) indicative of the particular function of the key. The processor within the mobile terminal 12 (discussed in more detail in connection with FIG. 4) is programmed to interpret a given key 30 in accordance with the particular function identified by the label or otherwise assigned to such key 30. Each key 30 may be depressed by the operator in order to enter information and/or cause the mobile terminal 12 to perform a desired function.

The mobile terminal 12 also includes, for example, a bar code reader 32 which allows the operator to input information from bar code labels. Furthermore, the mobile terminal 12 includes an antenna 34 which allows the mobile terminal 12 to communicate wirelessly with a base station in a wireless network, for example. As will be discussed more fully with reference to FIG. 4, the mobile terminal 12 in the exemplary embodiment includes a radio transceiver which permits the mobile terminal 12 to communicate wirelessly with other devices such as an access point in a wireless network.

In addition, the mobile terminal 12 includes a communication port 36 exposed through a wall of the main housing 20. The communication port 36 permits the mobile terminal 12 to communicate information and/or download software via a hardwired connection. The port 36 may be any type of standard connector which allows the electronic circuitry within the mobile terminal 12 to communication with another device.

Figure 3:
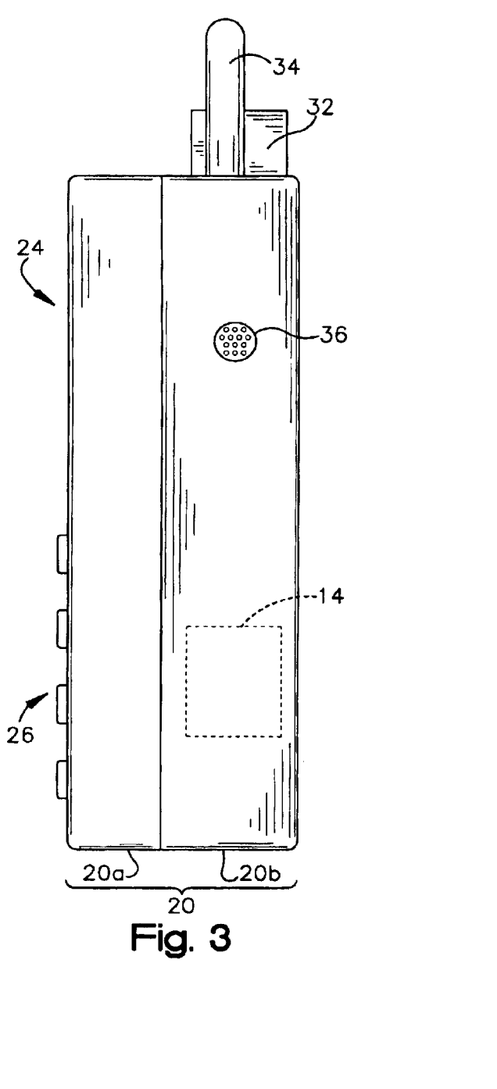
FIG. 3 is a side view of the mobile terminal shown in FIG. 2.

Turning briefly to FIG. 3, a side view of the mobile terminal 12 is shown. As can be seen, the main housing 20 of the mobile terminal 12 is made up of an upper portion 20a and a lower portion 20b, for example. The various components within the main housing 20 are assembled within the respective portions 20a and 20b, and the two portions are then joined together to form an integral housing 20. The portions 20a and 20b may be fixed together via a set of screws, a snap fit, etc.

As represented in phantom in FIG. 3, the mobile terminal 12 includes the passive tag 14 together with the other circuitry within the main housing 20. The passive tag 14 may be mounted on a circuit board with the other circuitry included in the mobile terminal. Alternatively, for example, the passive tag 14 may be mounted on an inside wall of the main housing 20 with cabling or the like providing the appropriate electrical connections to other components within the mobile terminal 12. The particular location of the passive tag 14 is not critical to the invention, although the passive tag 14 preferably is located in an area readily exposed to RF signals transmitted by the RF controller 18 (FIG. 1).

If the main housing 20 is plastic, the RF signals from the RF controller 18 will tend to pass through the housing 20 easily. If the main housing 20 is made of metal or a lossy material which would tend to shield the components within the housing, the passive tag 14 preferably is located at a place within the main housing 20 which includes an aperture to allow the RF signals to reach the passive tag 14.

Figure 4:
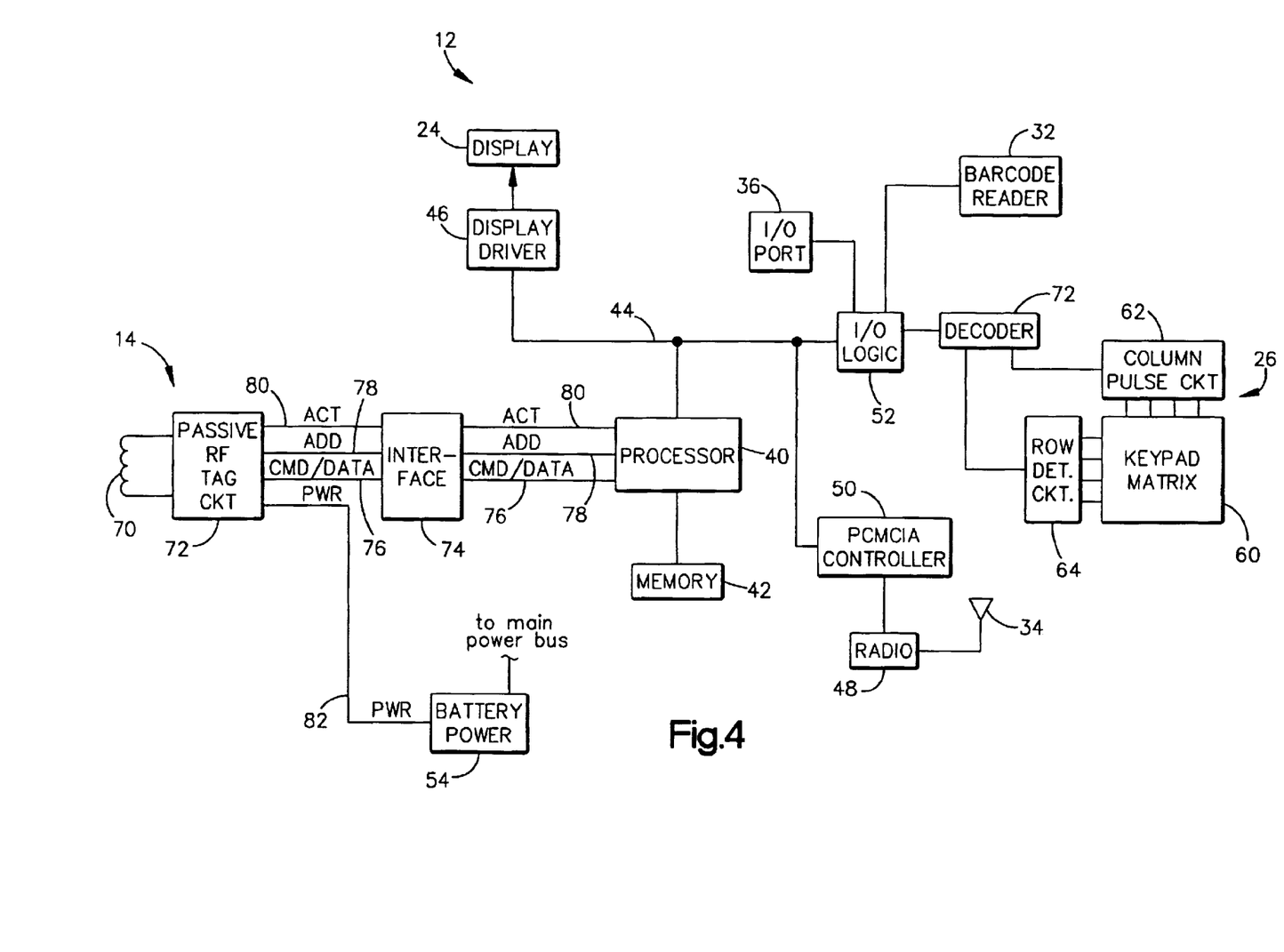
FIG. 4 is an electrical block diagram of a mobile terminal in accordance with the present invention.

FIG. 4 illustrates the electronic circuitry included within the main housing 20 of the mobile terminal 12. The mobile terminal 20 is controlled primarily by a processor 40. The processor 40 executes instructions stored in a non-volatile memory 42 for carrying out the various intended operations of the mobile terminal 12. The particular instructions stored in the memory 42 may represent a program which is loaded into the mobile terminal 12 via the communication port 26, for example. In addition, the processor 40 uses the memory 42 to store data or other information which is collected via the mobile terminal 12 (e.g., inventory or patient information, depending on the particular application).

The processor 40 is connected to an ISA bus 44 or other conventional type bus. The display 24 is coupled to the bus 44 via a display driver 46. The processor 40 is programmed to cause the display 24 to represent graphically to the operator appropriate display information during operation via the display driver 46. Such operation is conventional, hence further detail is omitted for sake of brevity.

The mobile terminal 12 includes a radio transceiver 48 which permits the mobile terminal 12 to communicate wirelessly with other devices, such as a base station, using conventional techniques. The transceiver 48 is coupled to the processor 40 via the bus 44 and a PCMCIA controller 50 as shown. In the event the mobile terminal 12 is to transmit information to another device, the processor 40 provides such information to the transceiver 48 via the bus 44 and the controller 50. The transceiver 48 in turn transmits the information as part of an RF signal to the other device using the antenna 34. On the other hand, information which is transmitted to the mobile terminal 12 from another device is received by the transceiver 48 via the antenna 34. The transceiver 48 in turn provides the information to the processor 40 via the controller 50 and the bus 44.

The mobile terminal 12 also includes an input/output (I/O) logic array 52 which provides conventional logic for receiving the respective input signals and output signals from the various I/O devices. Information to/from the communication port 36 and the barcode reader 32 is coupled to the processor 40 via the logic array 52 and the bus 44 using conventional techniques. Moreover, the mobile terminal 12 includes a battery based power supply 54 which provides the appropriate operating power to the various components within the mobile terminal 12.

The keypad 26 is conventional in design. The keypad 26 includes a keypad matrix 60 together with a column pulse circuit 62 and a row detector circuit 64. Using conventional techniques, the column pulse circuit 62 provides pulses to columns in the matrix 60 and the row detector circuit 64 identifies the row in which a depressed key 30 exists. Both the column pulse circuit 62 and the row detector circuit 64 are coupled to a decoder 66 which determines which key 30 has been depressed based on the outputs thereof. The decoder 66 in turn provides such information to the processor 40 via the I/O logic array 52.

As shown in FIG. 4, the passive tag 14 includes a coil 70 which functions as an antenna for receiving electromagnetic signals from the RF controller 18. As will be explained in more detail below in relation to FIG. 5, the passive tag 14 includes within a circuit 72 a demodulator and decoder which demodulates and decodes the modulated RF signal received from the RF controller 18. The resultant signal represents initial configuration information which is stored in memory in the circuit 72.

Data which is stored in memory in the circuit 72 is coupled to the processor 40 via an interface 74 on a command/data bus 76. Address information is provided by the processor 40 to the memory within the circuit 72 via the interface 74 and an address bus 78. In addition, the processor 40 provides an ACT control signal to the circuit 72 on line 80. The ACT signal is used to switch the memory within the circuit 72 from a passive mode to an active mode when the mobile terminal 12 is powered up. More specifically, the mobile terminal 12 is configured such that when it is powered up (e.g., via the battery power 54) in order to be operational, the ACT signal goes active. This causes power from the battery power 54 to be supplied to the circuit 72 via line 82 as discussed below in relation to FIG. 5.

The interface 74 is provided to perform any voltage conversion, line or data buffering, data conversion which may be necessary depending on the particular type of processor 40 and memory within the circuit 72. The general principles, however, are the same and hence operation of the circuit will be described as if the interface was not present.

Figure 5:
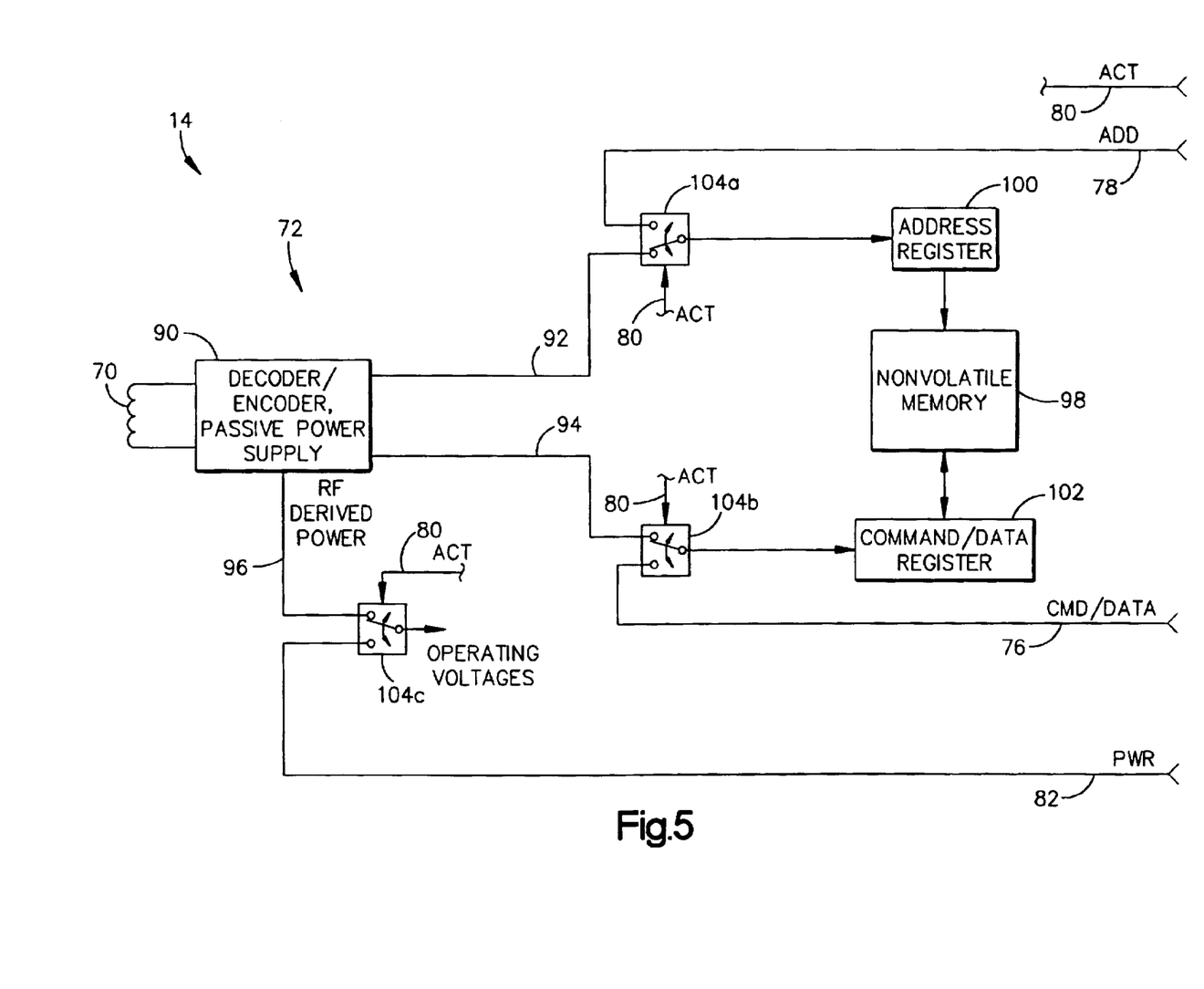
FIG. 5 is an electrical block diagram of the passive tag included in a mobile terminal in accordance with the exemplary embodiment of the present invention.

FIG. 5 illustrates the exemplary embodiment of the passive tag 14 in more detail. With the exception of some modifications discussed herein, the passive tag 14 is represented in substantial part by the passive tag described in U.S. Pat. No. 5,517,194, entitled "Passive RF Transponder and Method", issued May 14, 1996. The entire disclosure of U.S. Pat. No. 5,517,194 is incorporated herein by reference.

As shown in FIG. 5, the passive tag 14 includes the aforementioned coil 70 for receiving the RF signals transmitted by the RF controller 18. The received signals are input to a demodulation/decoder/power block 90 included in the circuit 72. As is described in more detail in U.S. Pat. No. 5,517,194, the block 90 includes circuitry for demodulating and decoding the received signal in order to obtain data such as the initial configuration information which had been modulated onto the RF signal by the controller 18. The electrical power for carrying out such functions is derived from the energy of the RF signal itself as described in the aforementioned '194 patent.

Address information which determines where the received initial configuration information is stored in memory is output from the block 90 on line 92. The data representing the received initial configuration information itself is output from the block 90 on line 94. Electrical power for operating the passive tag 14 when in the passive mode is derived from the RF signal by the block 90 and is output on line 96.

The passive tag 14 further includes the aforementioned memory 98, an address register 100, and a command/data register 102. While the tag 14 is in the passive mode (i.e., the ACT signal is non-active), address information provided by the block 90 on line 92 is input to the address register 100 which is coupled to the address input of the memory 98. The address in the address register 100 determines the particular location(s) in the memory 98 in which the initial configuration information is stored upon receipt of the RF signal from the RF controller 18. Also while the tag 14 is in the passive mode, the initial configuration information obtained from the received RF signal is provided by the block 90 on line 94 and is input to the command/data register 102. The command/data register 102 is coupled to the data port of the memory 98 so that the data in the register 102 is stored in the memory 98.

In order that the initial configuration information thus stored in the memory 98 may be accessed by the mobile terminal 12 upon being powered up (i.e., in an active mode where the ACT control signal is active), the circuit 72 includes switches 104a, 104b and 104c. Switch 104a serves to switch selectively either the address information from block 90 on line 92 or address information provided by the processor 40 on line 78 to the input of the address register 100. Switch 104b serves to switch selectively either line 94 from block 90 or line 76 from the processor 40 to the command/data register 102. As for switch 104c, this switch controls whether the operating power for the passive tag 14 comes from the RF derived power on line 96 or from line 82.

In the passive mode, the ACT signal is designed to be non-active and the switches 104a thru 104c are in the positions shown in FIG. 5. The mobile terminal 12 is likely within its packaging, powered down, and/or unassembled, etc., and is in need of receiving initial configuration information. The RF controller 18 (FIG. 1) is configured to operate in a manner similar to that described in the aforementioned U.S. Pat. No. 5,517,194. In particular, the RF controller 18 is configured to transmit the RF signal to the passive tag 14 with the initial configuration information modulated therein. The coil 70 receives the RF signal and derives power for operating the passive tag 14 from the RF signal. Block 90 functions to demodulate and decode the initial configuration information from the RF signal and places information in the form of digital data onto line 94. At the same time, block 90 provides appropriate addressing onto line 92.

The addressing on line 92 is coupled to the address register 100 via the switch 104a. The initial configuration information is coupled into the command/data register 102 via the switch 104b. As a result, the initial configuration information is stored in the nonvolatile memory 98. Power derived from the RF signal on line 96 is provided to the various components within the passive tag 14 via the switch 104c.

When powered up, the processor 40 within the mobile terminal 12 causes the ACT signal to become and remain active. This causes the switch 104a to allow for address information provided on line 78 from the processor 40 to be input to the address register 100. Similarly, the switch 104b allows data accessed from the memory 98 to be provided to the processor 40 via the command/data register 102 and line 76. The switch 104c causes operating power from the supply 54 to be provided to the passive tag 14.

The processor 40 is programmed as part of an initialization routine and/or general operation to access the information in the memory 98 upon being powered up in order to permit the mobile terminal 12 to carry out its intended functions. For example, upon initially being powered up the processor 40 is programmed to access the location in the memory 98 in which the network address or network identification of the mobile terminal 12 is to have been stored by the RF controller 18. In addition, or in the alternative, the processor 40 may retrieve one or more flags which have previously been stored in the memory 98 by the controller 18 to define prescribed operating parameters. As will be appreciated, there is a wide variety of types of initial configuration information which may be stored and retrieved from the memory 98 in accordance with the present invention.

Figure 6:
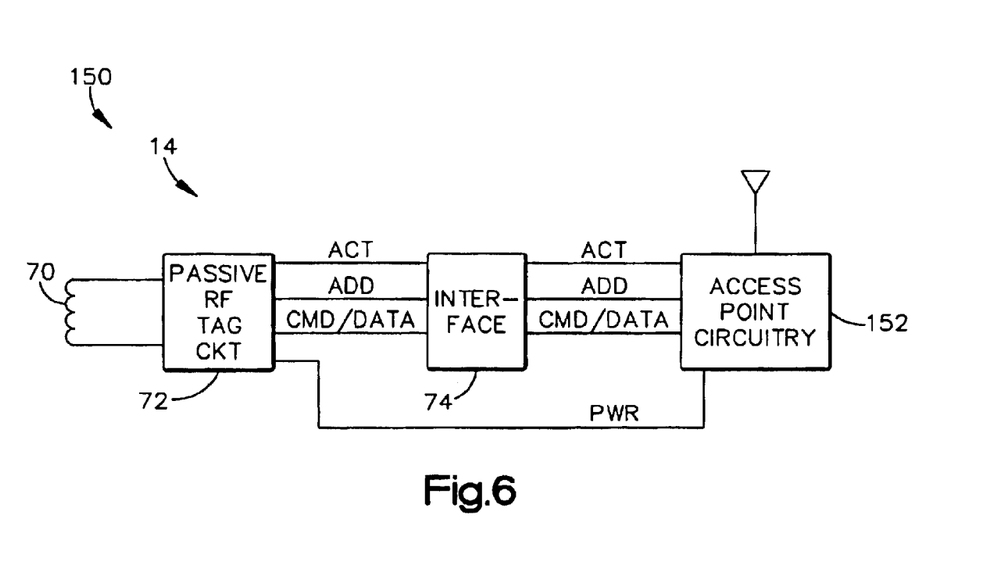
FIG. 6 is an electrical block diagram of an access point in accordance with the present invention.

FIG. 6 illustrates how the inventive features of the mobile terminal 12 in FIG. 4 can be extended to other wireless communication devices such as an access point 150. Operation is substantially similar to that described above in relation to the mobile terminal 12, with the exception that the passive tag 14 is coupled to the processor and power supply of a standard access point circuit 152 rather than a mobile terminal circuit.

The embodiments described above utilize generally a single port memory which selectively receives the signal from the block 90 or the processor 40 via the set of switches 104a thru 104c. In an alternative embodiment, a dual-port memory can be used in place of the memory 98. A first port is coupled to the block 90 for receiving the initial configuration information from the modulated RF signal. A second port is coupled to the processor 40 which enables the processor to access the initial configuration information from the memory when the device is powered up.

Accordingly, the present invention provides a means by which wireless communication devices can be initially configured without requiring full assembly and/or operation. This can significantly reduce the time and/or cost associated with programming the initial configuration information into the devices.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A wireless communication device destined for operation in a particular wireless network, comprising:
   a transceiver for communicating in the wireless network;
   a processor for controlling operations of the transceiver based on initial configuration information including network communication parameters corresponding to this particular wireless network;
   a passive tag for wirelessly receiving the initial configuration information from an external source and storing the initial configuration information in a non-volatile memory at a time when the wireless communication device is otherwise in a non-operational mode; and
   an interface for enabling the processor to access the initial configuration information stored in the memory when the wireless communication device is in an operational mode and thereby allowing operation in the wireless network by drawing upon the initial configuration information,
   wherein the wireless communication device is non-operational by virtue of being unassembled.

2. A method for use in relation to a wireless communication device destined for operation in a particular network, the device including a transceiver for communicating in the wireless network, a processor for controlling operations of the transceiver based on initial configuration information including network communication parameters corresponding to this particular wireless network, and a passive tag, the method comprising the step of:
   transmitting the initial configuration information from a source external to the wireless communication device so as to be received by the passive tag and stored in a non-volatile memory within the passive tag while the wireless communication device is otherwise in a non-operational mode;
   interfacing the processor with passive tag to access the initial configuration information stored in the memory when the wireless device is in an operational mode; and
   operating in the wireless network by drawing upon the initial configuration information,
   wherein the wireless communication device is non-operational by virtue of being unassembled.

3. A method of initially configuring a wireless communication device destined for operation in a particular wireless network, the device comprising a transceiver for communicating in the wireless network, a processor for controlling operations of the transceiver based on initial configuration information including network communication parameters corresponding to this particular wireless network, a passive tag for wirelessly receiving the initial configuration information from an external source and storing the initial configuration information in a non-volatile memory at a time when the wireless communication device is otherwise in a non-operational mode, and an interface for enabling the processor to access the initial configuration information stored in the memory when the wireless communication device is in an operational mode and thereby allowing operation in the wireless network by drawing upon the initial configuration information; said method comprising the steps of:
   transmitting the initial configuration information from a source external to the wireless communication device;
   receiving the initial configuration information by the passive tag and storing the initial configuration information in the non-volatile memory;
   accessing the initial configuration information stored in the memory; and
   controlling operations of the transceiver based on the initial configuration information,
   wherein the wireless communication device is unassembled during the transmitting and receiving steps.

4. A method of configuring and operating a wireless communication device for a particular wireless network, said method comprising:
   manufacturing a plurality of wireless communication devices and storing them in an inventory, each of the devices having a transceiver for communicating in a wireless network, a processor, and a passive tag;
   retrieving one of the wireless communication devices from the inventory when a request is received and the particular wireless network has been identified;
   conveying initial configuration information to the passive tag of the retrieved wireless communication device, wherein the initial configuration information includes network communication parameters corresponding to said particular wireless network;
   storing the conveyed initial configuration information in a non-volatile memory;
   interfacing the processor of the retrieved wireless communication device with its passive tag to access the initial configuration information stored in the memory; and
   controlling operation of the transceiver of the retrieved wireless communication device based upon the initial configuration information,
   wherein the wireless communication devices stored in the inventory are not fully assembled, and wherein the conveying and storing steps are performed while the retrieved wireless communication device is not fully assembled.

5. A wireless communication device destined for operation in a particular wireless network, comprising:
- a transceiver for communicating in the wireless network;
- a processor for controlling operations of the transceiver;
- a passive tag for receiving the initial configuration information from an external source and storing the initial configuration information in a non-volatile memory at a time when the wireless communication device is otherwise in a non-operational mode, wherein the initial configuration comprises information necessary to locate and communicate with a certain server in order to download certain software therefrom; and
- an interface for enabling the processor to access the initial configuration information stored in the memory when the wireless communication device is in an operational mode;
- wherein the processor is programmed to locate and communicate with the server via the initial configuration information and to direct downloading of said software from the server, thereby allowing operation in the wireless network by drawing upon the downloaded software,
- wherein the wireless communication device is non-operational by virtue of being unassembled.

6. A method of configuring and operating a wireless communication device in a particular wireless network, said method comprising:
- manufacturing a plurality of wireless communication devices and storing them in an inventory, each of the devices having a transceiver for communicating in a wireless network, a processor, and a passive tag;
- retrieving one of the wireless communication devices from the inventory when a request is received and the particular wireless network has been determined;
- conveying initial configuration information to the passive tag of the retrieved wireless communication device, wherein the initial configuration information includes data necessary to locate and communicate with a selected server;
- storing the conveyed initial configuration information in a non-volatile memory,
- interfacing the processor of the retrieved wireless communication device with its passive tag to access the initial configuration information stored in the memory so that the processor can locate the selected server;
- communicating with the server, via the processor, and downloading a software package to the processor; and
- controlling operation of the transceiver of the retrieved wireless communication device based upon the downloaded package,
- wherein the wireless communication devices stored in the inventory are not fully assembled, and wherein the conveying and storing steps are performed while the retrieved wireless communication device is not fully assembled.

* * * * *